United States Patent [19]

Barone

[11] 4,233,535
[45] Nov. 11, 1980

[54] PRIME MOVER HAVING A LEAKAGE FLUX CONDUCTING DEVICE SECURED THERETO

[75] Inventor: Michael R. Barone, Sycamore, Ill.

[73] Assignee: General Electric Company, Fort Wayne, Ind.

[21] Appl. No.: 886,672

[22] Filed: Mar. 15, 1978

[51] Int. Cl.$^2$ ............................................. H02K 1/12
[52] U.S. Cl. ..................................... 310/256; 310/42; 310/58; 310/89; 29/596
[58] Field of Search ................... 310/256, 52, 56, 58, 310/89, 91, 88, 157, 42; 29/596

[56] References Cited

U.S. PATENT DOCUMENTS

| | | | |
|---|---|---|---|
| 3,714,483 | 1/1973 | Nurnberg | 310/256 |
| 3,731,127 | 5/1973 | Harrington | 310/256 |
| 3,979,822 | 9/1976 | Halm | 310/89 |

*Primary Examiner*—R. Skudy
*Attorney, Agent, or Firm*—Joseph E. Papin

[57] ABSTRACT

A prime mover has a non-ferrous end plate with a leakage flux conducting device disposed in a preselected assembly position thereon. The device conducts across the end plate leakage flux emanating from a magnetic field established between a pair of opposite pole winding means of the prime mover upon the energization thereof. Fingers integral with the device are provided for securing it in the preselected assembly position thereof on the end plate.

12 Claims, 8 Drawing Figures

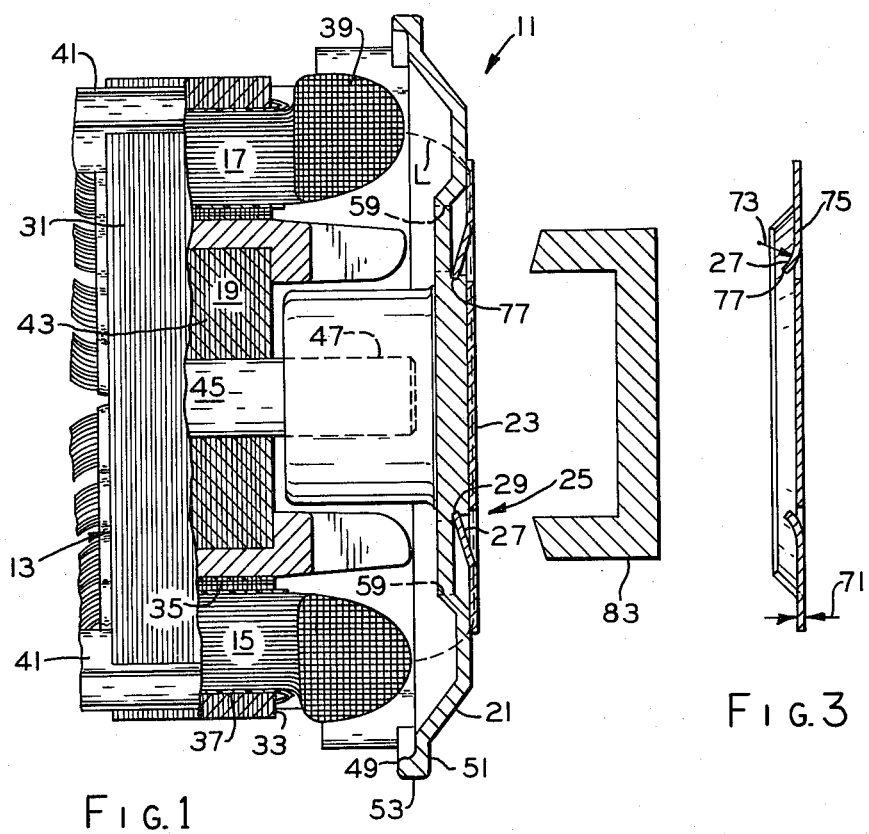
FIG. 1
FIG. 3
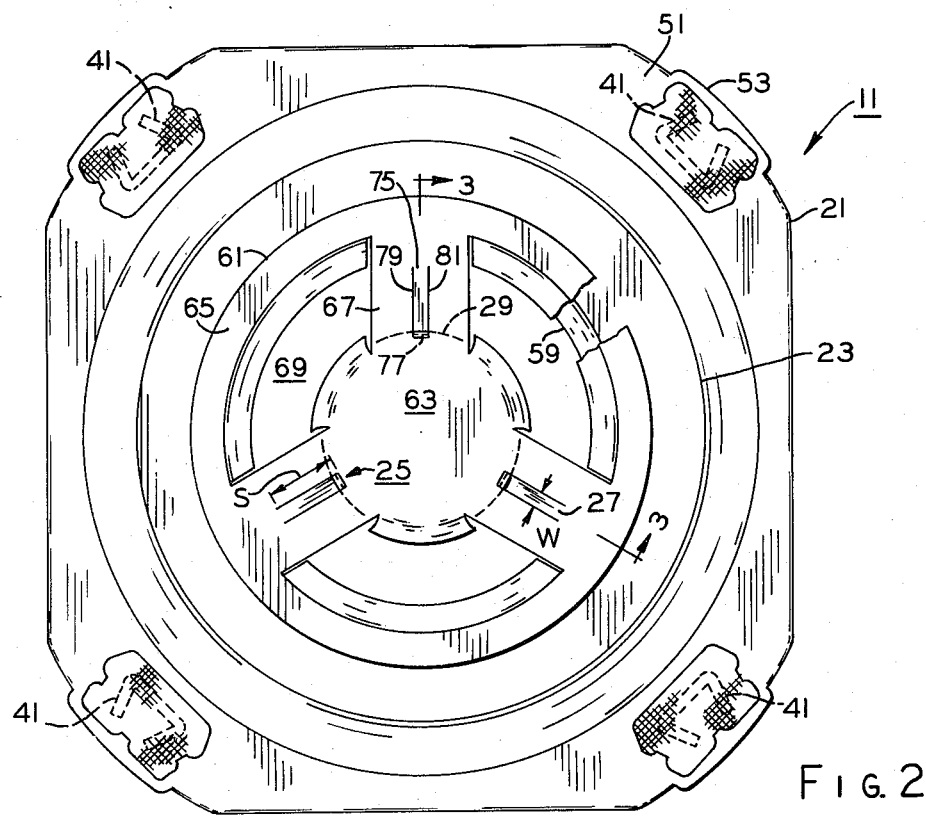
FIG. 2

PRIME MOVER HAVING A LEAKAGE FLUX CONDUCTING DEVICE SECURED THERETO

FIELD OF THE INVENTION

This invention relates in general to prime movers and in particular to a prime mover utilizing a leakage flux conducting device and a method of making a leakage flux.

BACKGROUND OF THE INVENTION

Various and sundry types of prime movers, such as dynamoelectric machines or electric motors for instance, have been operated in particular environments in which foreign ferrous material objects or particles were present. For instance, in the environment of an electric dishwasher, the lower one of the end plates of the electric motor utilized to drive such dishwasher was located closely adjacent the floor on which the dishwasher was supported, and various foreign ferrous material objects, such as thumbtacks, pins, needles or various other ferrous metal objects or particles for instance, may have been inadvertantly disposed on the floor in close association with such lower end plate of the electric motor. In the event that the aforementioned lower end plate of the electric motor was formed from a non-ferrous material, leakage flux emanating from a magnetic field generated by such electric motor upon its energization may have deleteriously effected the magnetic ingestion of the foreign ferrous material objects into such electric motor through the ambient air passages in the non-ferrous end plate. In a copending application of Allen A. Brammerlo Ser. No. 886,874 filed Mar. 15, 1978 which is specifically incorporated by reference herein, a leakage flux conducting device having passage means therein for ambient air is secured to a non-ferrous end plate of a prime mover, and such device is provided with a mass great enough so that such device and passage means remain unsaturated with respect to the conducted leakage flux thereby to obviate deleterious magnetic attraction through such passage means of the aforementioned foreign ferrous material objects into the prime mover.

In effecting the attachment of a leakage flux conducting device to a non-ferrous end plate of a prime mover, one of the disadvantageous or undesirable features is believed to be the possibility of effecting deleterious distortion of a portion of the end plate and/or the possibility of effecting deleterious distortion or overloading of other components of the prime mover, such as for instance the components of a thrust system or the like of the prime mover.

SUMMARY OF THE INVENTION

Among the several objects of the present invention may be noted the provision of an improved prime mover which overcomes the disadvantageous or undesirable features discussed above, as well as others, with respect to the prior art; the provision of such prime mover in which the device includes integral means for securing or mounting the device to the prime mover; the provision of such prime mover in which the force exerted on the device to effect the mounting thereof to the prime mover is predeterminately limited; the provision of such prime mover in which the predetermined limitation of force transferred to the prime mover upon the assembly thereto of the device may be accomplished predeterminately sizing selected components or portions of the device; the provision of such prime mover in which the structural mounting elements of the device are arranged so as to provide at least a desirable flow of ambient air through passage means therefor in the device; and the provision of such prime mover which is simplistic in design, economically manufactured and easily assembled. These as well as other objects and advantageous features of the present invention will be in part apparent and in part pointed out hereinafter.

In general, a prime mover in one form of the invention has a stationary assembly with at least a pair of opposite pole winding means adapted for excitation to establish a magnetic field therebetween. A rotatable assembly is disposed in magnetic coupling relation with the stationary member, and at least one non-ferrous end plate is disposed in journaling engagement with the rotatable assembly. A device is arranged in a preselected assembly position on the at least one end plate for conducting leakage flux emanating from the magnetic field generally across the at least one end plate between the at least winding means pair with the device having a mass great enough to remain unsaturated with respect to the conducted leakage flux. Means for securing the device in its preselected assembly position comprises a plurality of means integral with the device for deformation with respect to the device and the at least one end plate into gripping engagement with adjacent portions of the at least one end plate so as to prevent the displacement of the device from the preselected assembly position thereof on the at least one end plate.

BRIEF DESCRIPTION OF THE DRAWINGS

FIG. 1 is a sectional view of a prime mover in one form of the invention illustrating principles which may be practiced in performing a method of making a leakage flux conducting device and securing it to the prime mover;

FIG. 2 is an end view of the prime mover of FIG. 1;

FIG. 3 is a sectional view of the leakage flux conducting device taken along line 3—3 of FIG. 2;

The exemplifications set out herein illustrate the preferred embodiments of the invention in one form thereof, and such exemplifications are not to be construed as limiting the scope of the disclosure or the scope of the invention in any manner.

DETAILED DESCRIPTION OF THE PREFERRED EMBODIMENT

Figure 4:
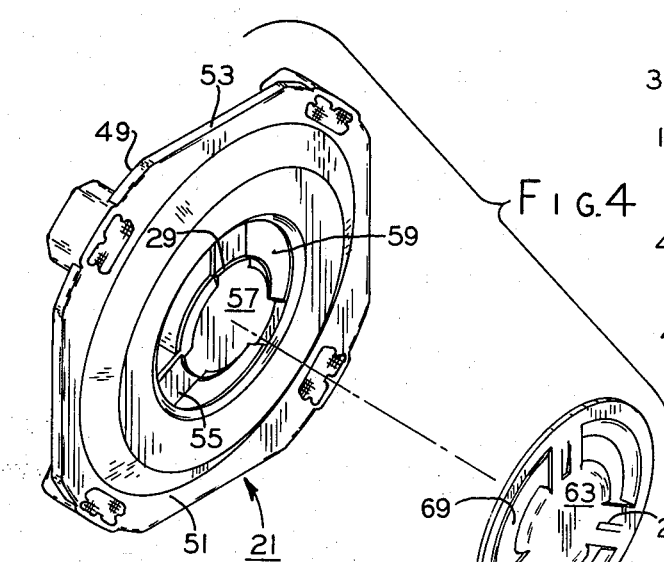
FIG. 4 is an exploded isometric view of an end plate of the prime mover and the leakage flux conducting device of FIG. 1.
Figure 5:
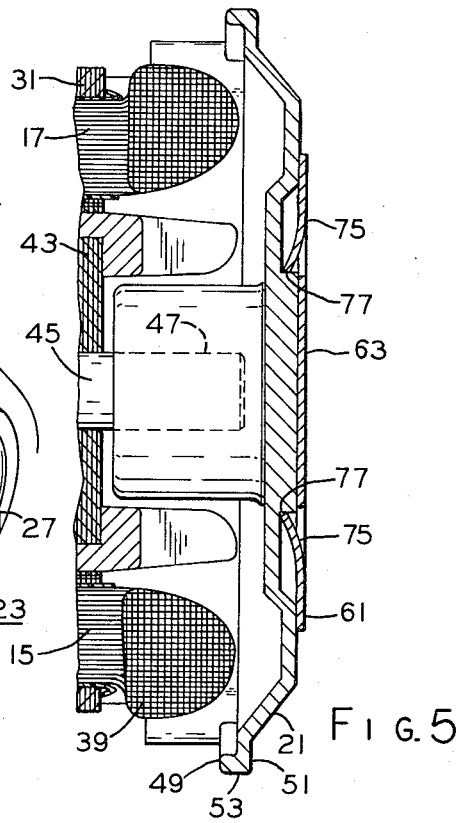
FIG. 5 is a sectional view of the leakage flux conducting device located on the end plate of the prime mover prior to the securement thereto of the device.

Referring now to the drawings in general, a prime mover or dynamo-electric machine 11 in one form of the invention is provided with a stationary assembly 13 having at least a pair of opposite pole winding means 15, 17 adapted for excitation to establish a magnetic field therebetween (FIG. 1). A rotatable assembly 19 is disposed in magnetic coupling relation with stationary assembly 13, and at least one non-ferrous end plate 21 is disposed in journaling engagement with the rotatable assembly (FIG. 1). A device or flux path providing means, such as a ferrous material shield or member 23, is arranged in a preselected assembly position on end plate 21 for conducting leakage flux emanating from the magnetic field generally across the end plate between winding means 15, 17, and the device has a mass predeterminately great enough so as to remain unsaturated with respect to the conducted leakage flux (FIGS. 1-3). Means, indicated generally at 25, is provided for securing the device 23 in its preselected assembly position and comprises a plurality of means, such as generally elongate deformable tabs or fingers 27, integral with the device for deformation with respect to the device and end plate 21 into gripping engagement with adjacent or confronting portions or abutments 29 of the end plate so as to prevent or oppose the displacement of the device from the preselected assembly position thereof on the end plate (FIGS. 1 and 4).

More particularly and with specific reference to FIG. 1, stationary assembly 13 of prime mover 11 comprises a ferromagnetic core or stator 31 which may be formed of a plurality of stacked laminations, as shown for purposes of illustration, or which may be of the powdered iron or cintered metal type. Stator 31 is provided with an end or end face 33 having a bore 35 intersecting therewith, and the bore is also intersected by a plurality of winding slots 37 in which winding means 15, 17 are located with suitable insulation therebetween. Stationary assembly 13 includes winding means 15, 17, and the winding means may comprise a pair of opposite pole main or run windings and a pair of opposite pole auxiliary or start windings electrically displaced from each other; however, it is contemplated that other winding means having various different configurations, interconnections and phase relationships may be utilized within the scope of the invention in one form thereof so as to meet the objects and advantageous features of such invention. Winding means 15, 17 are arranged to form a generally annular grouping of end turns 39 thereof disposed adjacent stator end 33 and extending generally axially therebeyond, and end plate 21 is disposed on prime mover 11 so as to be spaced from the stator end face and spaced adjacent the end turn grouping, respectively. A plurality of structural members or beams 41 are carried by or otherwise fixedly connected to stator 31 adjacent the outer peripheral portion thereof, and the ends of the beams are fixedly connected by suitable means to end plate 21. If a more detailed discussion of the connection of beams 41 to stator 33 and the connection of beams 41 to end plate 21 is desired, reference may be had to U.S. Pat. No. 3,858,067 issued to Charles W. Otto on Dec. 31, 1974 and to U.S. Pat. No. 3,867,654 issued to Charles W. Otto on Feb. 18, 1974, and each of these patents is specifically incorporated herein by reference. Although the particular constructions of stationary assembly 13 and end plate 21 are disclosed herein for purposes of illustration, it is contemplated that other prime mover constructions may be utilized within the scope of the invention so as to meet the objects thereof. For instance, in one such other contemplated construction, a stator may be enclosed within a housing therefor with opposite end plates secured to the housing by suitable means.

Rotatable assembly 19 includes a rotor 43 rotatably disposed within bore 35 of stator 31 so as to be magnetically coupled therewith, and the rotor is mounted to a shaft 45 for conjoint rotation therewith. Shaft 45 is provided with an end or journaled section 47 which is rotatably received or otherwise suitably journaled or supported in end plate 21.

End plate 21 is provided with a pair of generally opposite interior and exterior faces 49, 51 with interior face 49 being disposed in spaced relation generally adjacent winding end turns 39, and a generally outer marginal section 53 to which beams 41 are attached, as previously mentioned, is interposed between the opposite faces of the end plate. A plurality of generally radially extending supports or extensions 55 are integrally formed between outer marginal section 53 and a generally centrally located means, such as an axially extending hub 57 or the like, for rotatably journaling or supporting end section 47 of rotor shaft 45. Bearing means (not shown) may be arranged within hub 57 in bearing or journaling engagement with end section 47 of rotor shaft 45, and the outer peripheral surface of the hub comprises or defines the abutment plurality 29 for engagement with fingers 27 of device 23, as discussed in greater detail hereinafter. While abutment plurality 29 are defined as being comprised by the outer peripheral surface of hub 57 merely for purposes of disclosure, it is contemplated that such abutments may be located on any convenient section or part of end plate 21, such as for instance on supports 55 thereof, within the scope of the invention so as to meet the objects and advantages of such invention. A plurality of means, such as openings or passages 59, are provided in end plate 21 for the passage therethrough of ambient air into cooling relation with stationary assembly 13 and rotatable assembly 19, and the passage means or passages 59 are defined between outer marginal section 53, supports 55 and hub 57, respectively. While end plate 21 is preferably formed of a non-ferrous material, such as aluminum or an alloy thereof for instance, it is contemplated that other end plates formed from other non-ferrous metals or alloys thereof and also resin materials may be utilized within the scope of the invention so as to meet the objects and advantageous features of the invention. Further, although end plate 21 is described and illustrated herein as having a particular shape or configuration, it is further contemplated that other end plates having various other shapes or configurations may also be utilized within the scope of the invention so as to meet the objects and advantageous features of the invention.

As employed with prime mover 11, device 23 is adapted for obviating the magnetic attraction ingress or ingestion of foreign ferrous material objects, such as thumbtacks, pins, needles, nails, screws or other ferrous metal objects or particles or the like (not shown) into the prime mover through passages 59 in end plate 21 into deleterious magnetic attraction engagement with various prime mover components or into deleterious mechanical interference engagement therebetween upon the energization of the prime mover to create the magnetic field thereof, as discussed hereinafter. For purposes of illustration, device 23 is disclosed as being preferably punched or lanced from a ferrous material, such as sheet steel for instance, and various types of tooling and equipment, such as for instance progressive die sets, may be utilized to this end; however, for the sake of brevity, a description of such tooling and equipment is omitted. Device 23 is provided with an outer peripheral portion, such as a generally annular rim or section 61 or the like for instance, and an inner peripheral portion, such as a generally circular disc or section 63 or the like for instance, spaced generally radially inwardly of the rim. A plurality of integral flanges 65 or the like may be bent generally away from rim 61 if desired. A plurality of arms or arm means, such as generally radially extending spokes 67 or the like, are integrally formed or otherwise connected between rim 61 and disc 63, and a plurality of means, such as openings or passages 69, are respectively defined between the rim, disc and arms so as to extend through device 23. As previously mentioned, device 23 is utilized to conduct leakage flux upon energization of prime mover 11, and to this end, the device is provided with a preselected or predetermined mass great enough so that the device remains unsaturated or in an unsaturated condition with respect to the leakage flux conducted thereby; thus, it may be noted that device 23 is provided with a preselected cross-section or thickness 71 in the direction of the path of leakage flux L therethrough. Since device 23 remains unsaturated with respect to leakage flux L carried or conducted thereby, it may also be noted that the leakage flux will not carry into or carry across passages 69 in the device; therefor, such passages 69 define null areas with respect to the leakage flux, i.e., such areas are devoid of leakage flux upon the energization of prime mover 11, as discussed hereinafter.

Fingers or projections 27 are lanced or otherwise deformed from arms 67 of device 23 with the fingers having a preselected radius or generally arcuate configuration 73 (as best seen in FIG. 3), and the fingers have a pair of opposite end portions 75, 77 interposed between a pair of opposite side edges 79, 81, FIGS. 2 and 3. Opposite end portions 75 of fingers 27 are integrally formed with arms 67, and opposite end portions 77 define free ends of the fingers. It may be noted that fingers 27 have a length or span S between opposite end portions 75, 77 predeterminately greater than a width W thereof between opposite side edges 79, 71. Such predetermined proportioning between length S and width W of fingers 27, when considered with respect to the thickness or cross-sectional dimension 71 of device 23, is effective to predeterminately limit the necessary force exerted on the fingers so as to effect the deformation thereof in order to urge free end portions 77 into the gripping engagement with abutments 29 on end plate 21 thereby to oppose the displacement of the device from its preselected assembly position on the end plate, as discussed in detail hereinafter. Although the particular shape or configuration of device 23 and its component parts is disclosed for purposes of illustration, it is contemplated that other such devices having other shapes or configurations and being formed by various other processes may be utilized within the scope of the invention so as to meet the objects and advantageous features of such invention.

Referring again in general to the drawings and recapitulating at least in part with respect to the foregoing, there is illustrated a method for making leakage flux conducting device 23 and securing it in the preselected assembly position on non-ferrous end plate 21 of prime mover 11 (FIGS. 1–4). Device 23 conducts generally across face 51 of end plate 23 leakage flux L emanating from the magnetic field generated or established between winding means 15, 17 of prime mover 11 upon the energization thereof (FIG. 1). In this method, device 23 is formed with a mass predeterminately great enough so that the device remains unsaturated with respect to leakage flux L conducted or carried thereby, and there is provided on the device a plurality of means, such as fingers 27, arranged for deformation into gripping engagement with associated parts, such as abutments 29, of end plate 21 (FIGS. 2 and 3). Device 23 is moved or otherwise disposed or arranged into its preselected assembly position on end plate 21, and the deformation means or fingers 27 are deformed into the gripping engagement with abutments 29 on the end plate thereby to prevent or oppose the displacement of the device from its preselected assembly position on the end plate (FIGS. 1 and 4).

More particularly and with specific reference to FIGS. 2–4, it will be recalled that fingers 27 are originally formed with preselected radii 73 (as best seen in FIG. 3), and it may be noted that free ends 77 of the fingers ae predeterminately arranged with each other so as to be disposed at least closely adjacent their respective cooperating abutments 29 on end plate 21 as device 23 is moved into its preselected assembly position on the end plate. It is contemplated that device 23 may be loaded or placed in its preselected assembly position on end plate 21 either manually or by automatic assembly equipment (not shown) within the scope of the invention so as to meet the objects and advantageous features of such invention. When device 23 is so arranged or located in its preselected assembly position on exterior face 51 of end plate 21, passages 69 of the device are preferably arranged so as to generally coincide, align or at least communicate with passages 59 in the end plate in order to provide adequate or desired flow of ambient air therethrough, and arms 67 of the device are disposed generally in overlaying relation with supports 55 of the end plate. As previously mentioned, free ends 77 of fingers 27 are arranged at least closely adjacent their respective abutments 29 on the end plate, and disc 63 is disposed generally adjacent end section 47 of rotor shaft 45 so as to be in flux transfer relation therewith. Further, rim 61 of device 23 is arranged or disposed adjacent end turns 39 of winding means 15, 17 so as to be in flux transfer relation therewith.

With device 23 so disposed in the preselected assembly position thereof on end plate 21, as described above, a tool 83 or the like (such as that shown schematically in FIG. 1 for instance) may be engaged with fingers 27 so as to effect conjoint deformation of the fingers from their generally arcuate configuration 73 (as best seen in FIG. 3) into the assembled configuration thereof (as best seen in FIG. 1). When fingers 27 are so deformed or urged into their respective assembled configuration, it may be noted that free end 77 of the fingers are driven or urged into the aforementioned gripping engagement with their cooperating abutments 29 on end plate 21. Thus, the gripping engagement of free ends 77 of fingers 27 with their respective abutments 29 serves to secure device 23 in its preselected assembly position and to oppose or prevent the displacement of the device from its preselected assembly position on end plate 21. It may be noted that the aforementioned predetermined relation between length S and width W of fingers 27 when taken in conjunction with cross-section 71 of device 23 predeterminately limits the force required or necessary to effect the desired deformation of the fingers and, thus, also the force transferred to prime mover 11 upon such deformation of the fingers. It is believed that such aforementioned predetermined force limitation may be necessary in order to avoid undesirable distortion of component parts of end plate 21, such as for instance hub 57 thereof, or undesirable distortion or overloading of other component parts of prime mover 11, such as for instance a thrust bearing system or the like thereof (not shown). While device 23 is described above as being assembled to end plate 21 when it is mounted to prime mover 11 in its assembled condition, it is, of course, contemplated that the device may be first assembled to the end plate with the end plate being thereafter subsequently assembled with stationary assembly 13 and rotatable assembly 19 within the scope of the invention so as to meet the objects and advantageous features of such invention.

In the operation of prime mover 11, assume it is located in a particular environment, such as may be associated with an electric dishwasher for instance, so that the prime mover may be mounted to the dishwasher housing (not shown) with end plate 21 disposed in at least close relation with the floor or other support upon which the dishwasher housing may rest. In such environment, the possibility may always exist that the aforementioned foreign ferrous material objects or particles (not shown) may be present or inadvertantly disposed beneath the dishwasher housing on the floor so as to be generally in close spaced relation with end plate 21 of the prime mover 11. It is, of course, contemplated that prime mover 11 may be utilized with apparatus other than an electric dishwasher as well as in other environments in which foreign ferrous material objects or particles may be present within the scope of the invention so as to meet the objects thereof.

Upon the selective energization of prime mover 11, winding means 15, 17 are excited so as to establish or create the aforementioned magnetic field therebetween, and current is thus induced into rotor 43 to effect its energization and rotation conjointly with shaft 45 in hub 57 end plate 21. As shown schematically in FIG. 1, leakage flux L emanating from the magnetic field upon the establishment thereof flows or is transmitted from one of winding means 15, 17 to device 23 on end plate 21, and the device conducts the leakage flux or provides a short circuiting path for the leakage flux therethrough to the other of winding means 15, 17. Some of leakage flux L may be transferred from disc 63 of device 21 to end section 47 of rotor shaft 45 supported in hub 57 of end plate 21. Since device 23 is provided with a preselected mass great enough so that the device remains unsaturated with respect to the amount of leakage flux L it conducts, ambient air passages 69 in the device are, in effect, null areas with respect to the conducted leakage flux in the device; therefore, due to the unsaturated condition of the device, leakage flux L does not carry into or across passages 69 thereby to obviate magnetic attraction therethrough of the foreign ferrous material objects, as previously mentioned. Thus, when conducting leakage flux L, device 23 is effective to prevent the ingestion of foreign ferrous material objects through its ambient air passages 69 and the ambient air passages 59 in end plate 21 into deleterious magnetic engagement with the various current or flux carrying components of prime mover 11, i.e., for instance winding means 15, 17 since any attraction of the foreign ferrous material objects into engagement therewith may cause damage thereto so as to effect a short circuit in the winding means. Further, it may be noted that ambient air passages 69 in shield 23 are preferably predeterminately sized and assembled in position with respect to passages 59 in end plate 21 so as to effect an adequate or desirable rate of flow of ambient air therethrough in order to meet the desired criteria for proper cooling of prime mover 11.

Figure 6:
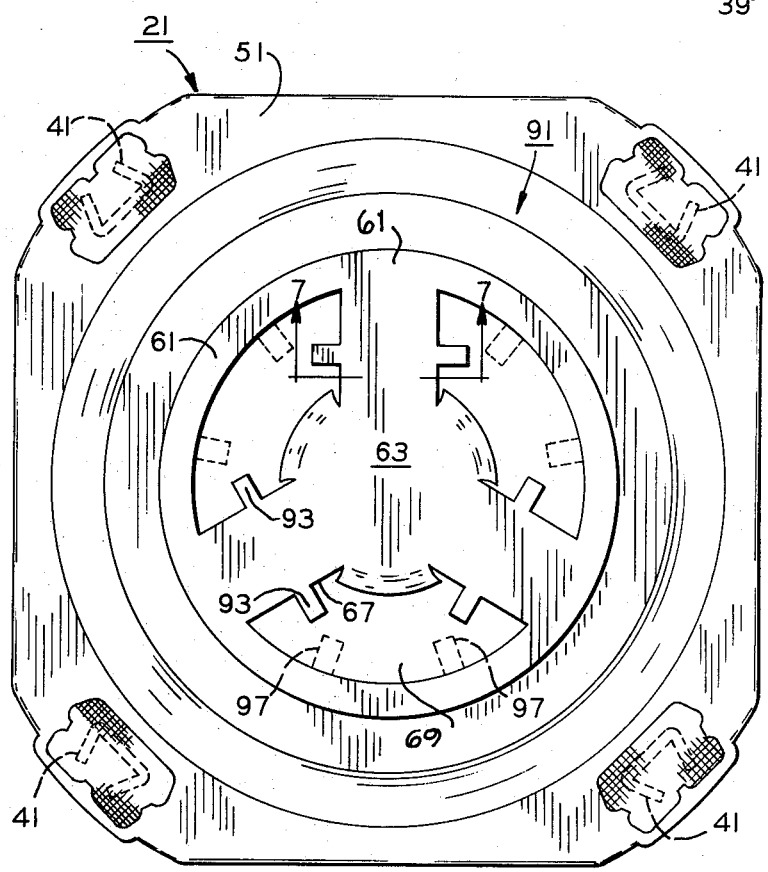
FIG. 6 is an end view of an alternative prime mover in one form of the invention teaching principles which may be practiced in an alternative method of making a leakage flux conducting device and securing it to a prime mover.
Figure 7:
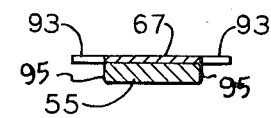
FIG. 7 is a sectional view taken along line 7—7 of FIG. 6 showing the leakage flux conducting device arranged in the preselected assembly position thereof on the end plate prior to the securement thereto of the device.
Figure 8:
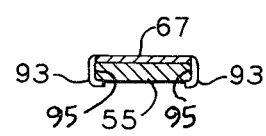
FIG. 8 is the same as FIG. 7 but showing the device secured in its preselected assembly position on the end plate.

Referring now to FIGS. 6–8, an alternative leakage flux conducting device or flux path providing means, such as a ferrous material shield or member 91, is formed generally in the same manner as the previously described device 23, has generally the same component parts, and functions generally in the same manner on end plate 21 of prime mover 11 in one form of the invention with the exceptions set out below. Device 91 is believed to have objects of its own as well as meeting at least some of the objects set forth hereinabove.

Device 91 is provided with means, such as pairs of deformable fingers or tabs 93, for securing the device to the end plate, and the tab pairs or securing means 93 are integrally formed with each of arm means 67 of the device so as to extend generally into passages 69 when the device is formed, as shown in FIG. 6. Device 91 may be moved into its preselected assembly position on end plate 27, as shown in FIG. 8, so that arm means 67 of the device are disposed generally in overlaying relation with supports 55 of the end plate. Thereafter, as shown in FIG. 8, tab pairs 93 may be bent, displaced otherwise deformed generally about supports 55 of end plate 21 into gripping engagement with adjacent or confronting portion or abutments 95 respectively provided therefor on the supports thereby to oppose or prevent the displacement of device 91 from the preselected assembly position thereof on the end plate. While tab pairs 93 are disclosed as being integral with arm means 67 of device 23, it is contemplated that other tab pairs, such as those illustrated in dotted outline at 97, may be integrally formed on rim 61 of device 91 and similarly deformed into displacement preventing engagement with end plate 21 with the scope of the invention so as to meet the objects and advantageous features of such invention. Further, it is also contemplated that modifications as to the shape or configuration of both devices 23 and 91 may be made so as to effect the respective mounting thereof adjacent interior face 49 of end plate 21 so as to also meet the objects and advantageous features of such invention.

From the foregoing, it is now apparent that a novel prime mover has been presented meeting the objects set out hereinbefore, as well as others, and it is contemplated that changes as to the precise arrangements, shapes, details and connections of the prime mover, as well as to the precise steps of the method, may be made by those having ordinary skill in the art without departing from the spirit of the invention or the scope thereof, as set out in the claims which follow.

What I claim as new and desire to secure by Letters Patent of the United States is:

1. In a prime mover having a stationary assembly with at least a pair of opposite pole winding means adapted for excitation to establish a magnetic field therebetween, a rotatable assembly coupled in magnetic relation with the stationary assembly, at least one nonferrous end plate having a pair of opposite faces and disposed in journaling engagement with the rotatable assembly, means arranged on one of the opposite faces of the end plate for providing a short-circuiting path to conduct leakage flux emanating from the magnetic field upon the establishment thereof generally across the one opposite face of the end plate between the at least winding means pair with the path providing means remaining unsaturated by the conducted leakage flux, means in the path conducting means for the passage therethrough of ambient air past the end plate into cooling relation with the rotatable assembly and the stationary assembly, and means for securing the path providing means in a preselected assembly position on the one opposite face of the end plate; the improvement comprising a plurality of abutment surfaces on the one opposite face of the end plate, and the securing means including a plurality of generally elongate deformable fingers lanced from the path providing means, each of said fingers of said plurality thereof having a pair of opposite end portions interposed between a pair of opposite side edges with one of said opposite end portions being respectively integral with the path providing means and the other of said opposite end portions arranged so as to be respectively urged into gripping engagement with said abutment surfaces of said plurality thereof in response to the deformation of said fingers upon the disposition of the path providing means in its preselected assembly position on the one opposite face of the end plate, and said fingers respectively having a length between said opposite end portions predeterminately greater than the width between said opposite side edges so as to predeterminately limit the force exerted by the deformation of said fingers in order to grippingly engage said other end portions thereof with said abutment surfaces and thereby prevent the displacement of the path providing means for its preselected assembly position on the one opposite face of the end plate.

2. In a prime mover having a stationary assembly with at least a pair of opposite pole winding means therein adapted for excitation to establish a magnetic field therebetween, a rotatable assembly disposed in magnetic coupling relation with the stationary member, at least one non-ferrous end plate disposed in journaling engagement with the rotatable assembly, a device arranged in a predetermined assembly position on the at least one end plate for conducting leakage flux emanating from the field generally across the at least one end plate between the at least winding means pair with the device having a mass predeterminately great enough so as to remain unsaturated with respect to the conducted leakage flux, and means for securing the device in its preselected assembly position; the improvement wherein the securing means comprises a plurality of means integral with the device for deformation with respect to the device and the at least one end plate into gripping engagement with adjacent portions of the at least one end plate so as to prevent the displacement of the device from the preselected assembly position thereof on the at least one end plate.

3. The prime mover as set forth in claim 2 wherein said deformation means of said plurality thereof each comprises a tab having a pair of opposite end portions, one of said opposite end portions being integral with the device and the other of said opposite end portions being disposed in the gripping engagement with one of the adjacent portions of the at least one end plate.

4. The prime mover as set forth in claim 2 wherein said deformation means of said plurality thereof each comprise a finger integrally extending from the device and having a free end portion urged into the gripping engagement with one of the adjacent portions of the at least one end plate in response to the deformation of each of said fingers.

5. The prime mover as set forth in claim 2 wherein each of said deformation means of said plurality thereof comprises a finger having a pair of opposite end portions interposed between a pair of opposite side edges, one of said opposite end portions being integral with the device and the other of said opposite end portions being disposed in the gripping engagement with one of said adjacent portions of the at least one end plate, and said finger having a length between said opposite end portions predeterminately greater than a width of said finger between said opposite side edges so as to predeterminately limit the force exerted by the deformation of said finger in order to grippingly engage said other opposite end portion with its adjacent portion on the at least one end plate thereby to prevent displacement of the device from its preselected assembly position on the at least one end plate.

6. In a prime mover adapted to be energized in an environment in which foreign ferrous material objects may be present, the prime mover having a stationary assembly with at least a pair of opposite pole winding means for excitation to establish a magnetic field therebetween, a non-ferrous end plate with means therein for the passage of ambient air into cooling relation with at least the at least winding means pair, a ferrous material member secured in a preselected assembly position to the end plate, the member having at least one passage therethrough to accommodate the ambient air and also having a preselected mass great enough to remain unsaturated in response to conduction between the at least winding means pair of leakage flux emanating from the magnetic field so as to obviate magnetic attraction of the foreign ferrous material object through the at least one passage and the passage means generally toward magnetic engagement with the at least winding means pair in the event of the presence of the foreign ferrous material objects in the environment upon the energization of the prime mover therein; the improvement comprising a plurality of tab means integrally extending from the shield and adapted for deformation in response to a force exerted on the member to effect the disposition of the member in its preselected assembly position on the end plate, said tab means of said plurality thereof including means urged into gripping engagement with a respective confronting part of the end plate upon the deformation of said tab means for retaining the member against displacement from its preselected assembly on the end shield.

7. In a prime mover adapted to be energized in an environment in which foreign ferrous material objects may be present, the prime mover having a stationary assembly with a pair of opposite pole winding means adapted for excitation to establish a magnetic field therebetween, a non-ferrous end plate having a plurality of means for the passage therethrough of ambient air into cooling relation at least with the winding means pair, a rotatable assembly arranged in magnetic coupling relation with the stationary assembly and having a section arranged in journaling engagement with the end plate, a ferrous material member having an outer peripheral portion arranged in flux transfer relation with the winding means pair and an inner peripheral portion arranged in flux transfer relation with the section of the rotatable assembly, a plurality of arms integrally arranged between the outer peripheral portion and the inner peripheral portion, at least one passage to accommodate the ambient air in the shield and communicating at least in part with at least one of the passage means of the plurality thereof, and the member having a mass great enough to remain unsaturated upon the conduction therethrough between the winding means pair of leakage flux emanating from the magnetic field so as to obviate magnetic ingestion of the foreign ferrous material objects through the at least one passage and the passage means generally toward magnetic engagement with the winding means pair in the event of the presence of the foreign ferrous material objects in the environment upon the energization of the prime mover therein; the improvement comprising a plurality of means integral with at least one of the outer peripheral portion, the inner peripheral portion and at least some of the arms of the plurality thereof and arranged for deformation with respect to the member and the end plate into gripping engagement with the end plate so as to prevent the displacement of the member from the end plate when the member is disposed in its preselected assembly position on the end plate.

8. In a prime mover having at least one ferromagnetic core, a plurality of winding means arranged with the core, at least one non-ferrous end plate, and a device associated with the at least one non-ferrous end plate for conducting thereacross leakage flux emanating from a magnetic field established upon the excitation of the winding means plurality and with the device having a mass great enough to remain unsaturated with respect to the leakage flux conducted thereby; the improvement comprising at least one means integral with the device and adapted for deformation into engagement with a confronting part of the at least one non-ferrous end plate thereby to associate the device with the at least one non-ferrous end plate and prevent the displacement therefrom of the device.

9. The prime mover as set forth in claim 8 wherein said at least one deformation means comprises a tab extending from the device into the engagement with the confronting part of the at least one non-ferrous end plate.

10. The prime mover as set forth in claim 8 wherein said at least one deformation means comprises a finger on the device and having a free end portion urged into the engagement with the confronting part of the at least one non-ferrous end plate in response to the deformation of said finger.

11. The prime mover as set forth in claim 8 wherein said at least one deformation means comprises a finger on the device having a length and width respectively preselected so as to predeterminately limit the force exerted on the confronting part of the at least one non-ferrous end plate upon the deformation of the finger into the engagement therewith.

12. The prime mover as set forth in claim 8 wherein said at least one deformation means comprises a finger having a pair of opposite end portions and a pair of opposite side edges, one of said opposite end portions being integral with the device and the other of said opposite end portions being disposed in the engagement with the confronting part of the at least one non-ferrous end plate, and said finger having a length between said opposite end portions predeterminately greater than a width of said finger between said opposite side edges so as to predeterminately limit the force exerted on the at least one non-ferrous end plate upon the deformation of said finger so as to effect the engagement of the other opposite end portion of said finger with the confronting part of the at least one non-ferrous end plate.

* * * * *